C. O. BOWMAN.
KITCHEN SPOON.
APPLICATION FILED JAN. 19, 1916.
1,211,062. Patented Jan. 2, 1917.
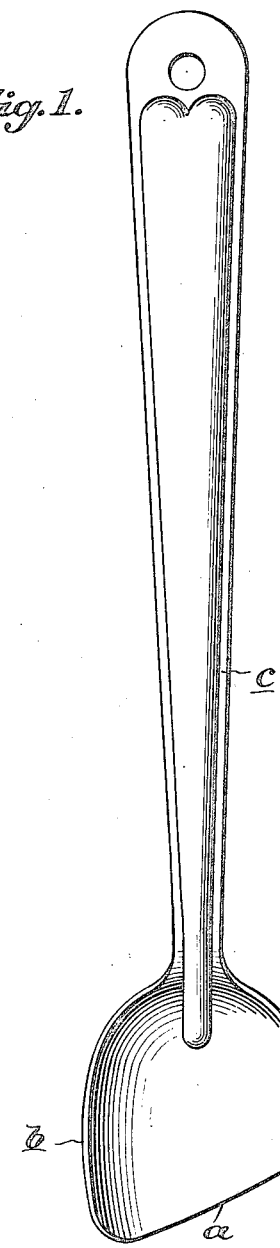
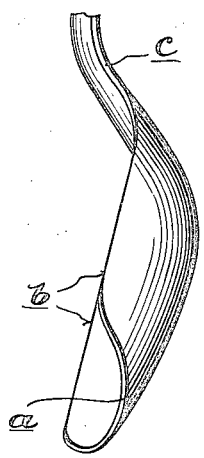
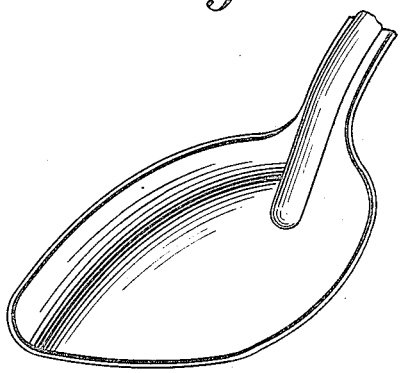
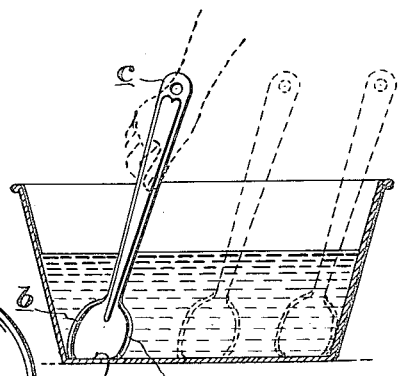

UNITED STATES PATENT OFFICE.

CARRIE OTTO BOWMAN, OF MESILLA PARK, NEW MEXICO.

KITCHEN-SPOON.

1,211,062. Specification of Letters Patent. Patented Jan. 2, 1917.

Application filed January 19, 1916. Serial No. 72,985.

*To all whom it may concern:*

Be it known that I, CARRIE OTTO BOWMAN, a citizen of the United States of America, and a resident of Mesilla Park, in the county of Dona Ana and State of New Mexico, have invented certain new and useful Improvements in Kitchen-Spoons, of which the following is a full and clear specification.

The object of this invention is to provide an inexpensive, simple and strong, as well as efficient, implement for stirring and mixing batter and other materials and which at the same time will have other advantageous kitchen uses, as more fully hereinafter set forth.

In the drawings—Figure 1 is a front elevation; Fig. 2 a side elevation; Fig. 3 a perspective view of an implement constructed in accordance with my invention; and Fig. 4 is a small diagrammatic view showing one way of using the implement in stirring material held in a pan.

My device can perhaps be best described by saying that it may be made, in its most desirable shape, by simply cutting off diagonally the bowl of a large spoon at a point well beyond the middle of the bowl, thereby providing a transverse end edge which is oblique in plan but is curved in end elevation. In the drawings, this front oblique edge is shown at *a* and it will be observed that this edge curves upwardly and merges into the upwardly curved edges *b* of the bowl. The usual handle *c* is attached to the bowl at its upper or rear edge. It will be observed that the edge *a* inclines in such direction as to make one edge *b* of the bowl longer than the other edge, so that when the handle of the implement is grasped in the usual way and the spoon is held at the natural angle for stirring and beating, as shown in Fig. 4, the edge *a* will be approximately parallel with the bottom of the pan.

It will be observed that in stirring and mixing batter and like materials in a kitchen utensil, the shape of the forward edge of the bowl enables it to be worked over the entire bottom surface of the pan without necessitating tilting or shifting of the pan or shifting the angle of the handle into any unnatural position, thereby enabling the operation of mixing and beating of the material to be accomplished in the quickest possible time and with the least possible labor.

It will be observed also that my device may be effectively used as a scraper for gathering and removing from the pan the batter after it is sufficiently stirred, the shape of the front edge of the bowl being such as to enable the pan to be quickly scraped over its bottom surface and around the corner. It will be seen also that as a scraper it will have various uses in the kitchen, and further that it may be used as a ladle or ordinary spoon, though, of course, as a ladle it will not have the holding capacity of the ordinary spoon or ladle.

A very important use of my device is in the stirring of foods while the same are cooking. It will be observed that with a bowl shaped as I describe several inches of the contents of the pan or dish will be moved in the stirring, whereas with the well known form of spoon now in use the bowl disturbs only a comparatively small portion of the contents near the bottom of the pan and thus frequently causes the food to burn or scorch. With my device the contents of the pan may be readily kept constantly on the move and with the least possible labor, thereby avoiding burning of the food even where it is of a kind that readily scorches. In preserving, my device will be especially valuable.

Having thus described my invention, what I claim is;

A kitchen implement consisting of a handle having attached thereto a spoon-like bowl whose forward edge extends obliquely across the bowl so as to provide a longer edge at one side of the bowl than at the other side, this oblique forward edge of the bowl curving to correspond with the cross-section of the bowl, for the purposes herein set forth.

In testimony whereof I hereunto affix my signature.

CARRIE OTTO BOWMAN.